Dec. 13, 1927.
I. COWLES
1,652,764
FORCE FEED LUBRICATING SYSTEM, ETC
Filed Nov. 29, 1924    2 Sheets-Sheet 2
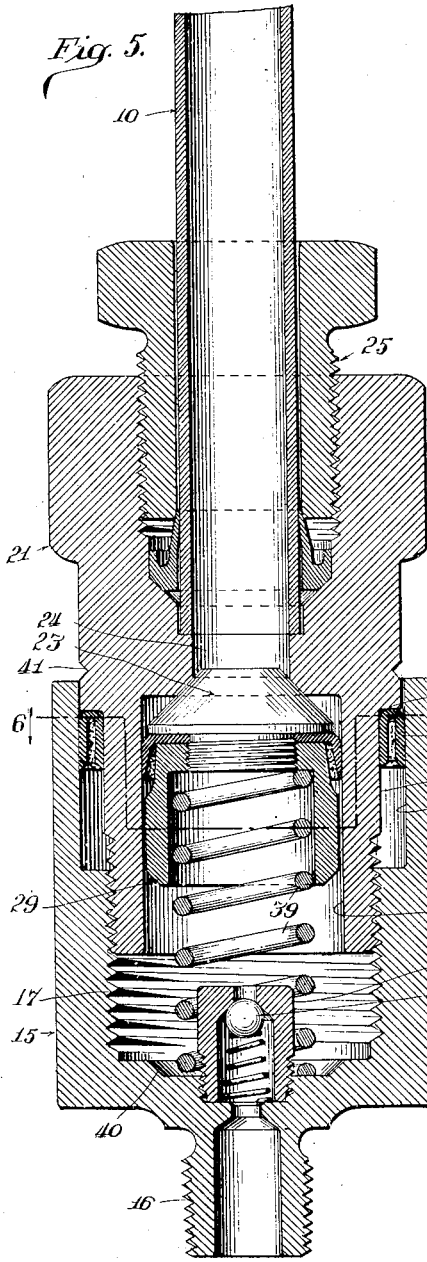
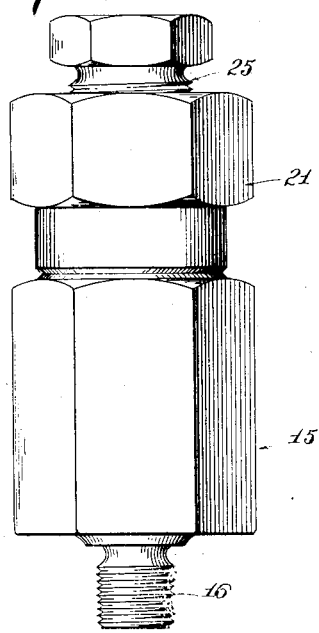
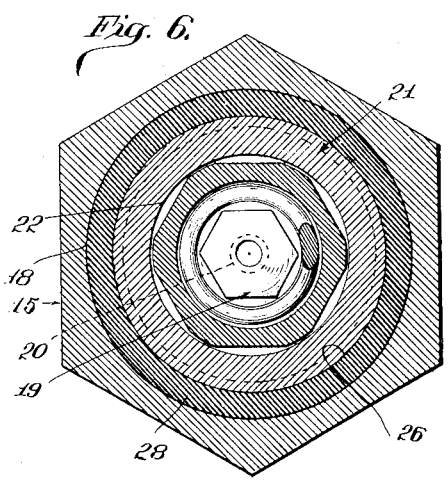
Inventor
Irving Cowles
By Rudolph Wm. Lotz
Attorney.

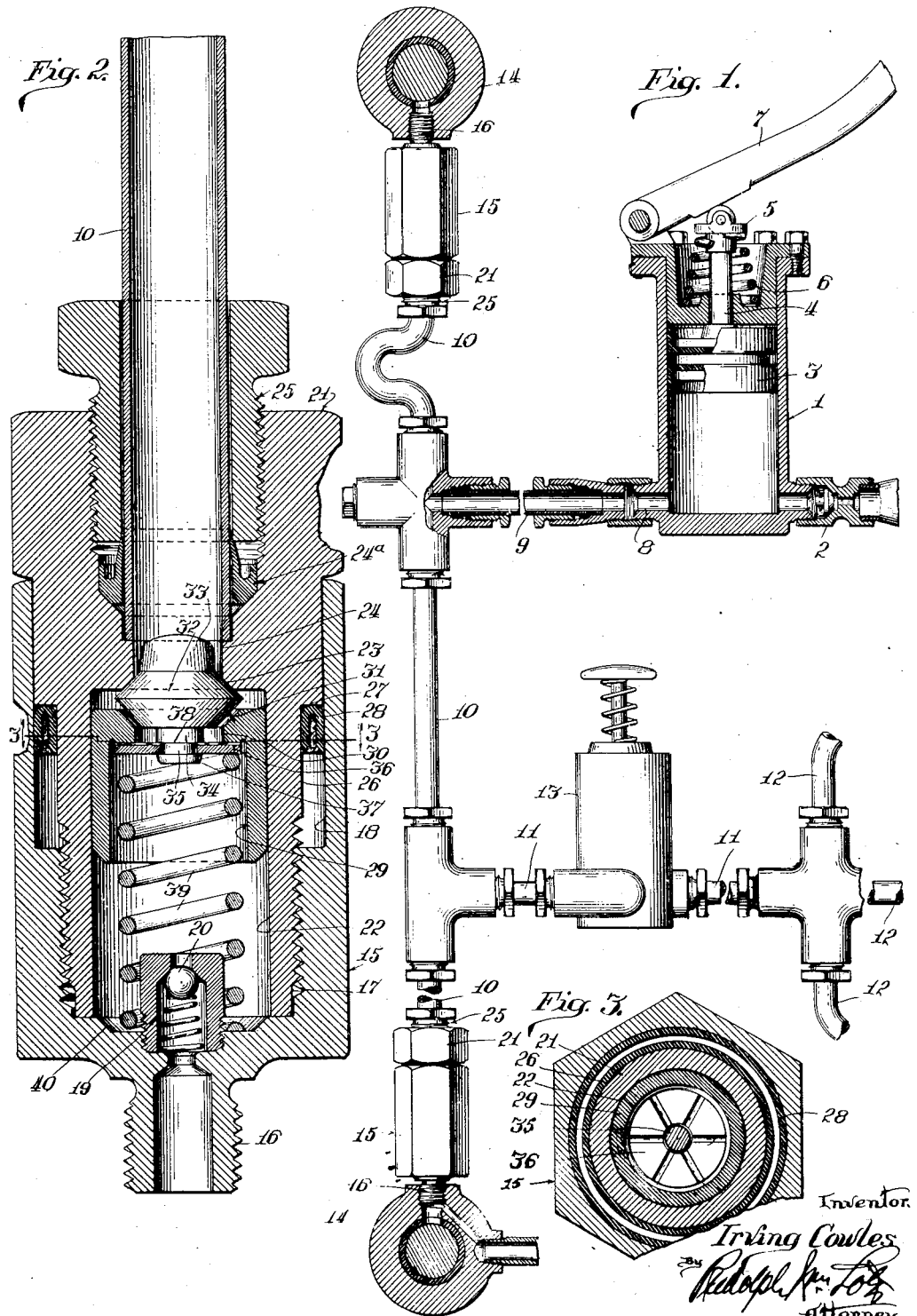

Patented Dec. 13, 1927.

1,652,764

UNITED STATES PATENT OFFICE.

IRVING COWLES, OF CHICAGO, ILLINOIS.

FORCE-FEED LUBRICATING SYSTEM, ETC.

Application filed November 29, 1924. Serial No. 752,916.

This invention has for its object to provide a direct pressure, measured feed lubricating system for simultaneously feeding lubricant at intervals from a central element to a number of bearings or other elements to be supplied therewith, such as engine and pump cylinders, etc., with such quantity or volume of lubricant as may be required by each such element independently of all others under substantially the full and direct pressure exerted at the central element and simultaneously with the application of said pressure.

The system comprises, preferably, a central pump or the like, manually or otherwise operable at intervals to discharge lubricant under high pressure into piping leading to the several bearings or other elements to be supplied, and devices interposed in said piping which effect, automatically, the measuring of the volume of lubricant to be supplied to each said element and the delivery of such measured or predetermined volume to said element under the full, direct pressure at which the lubricant is delivered from the pump and simultaneously with the application of pressure at the pump.

The objects of the invention include, in so far as the said measuring devices are concerned, the provision of fluid pressure actuated means for effecting discharge of the predetermined or measured volume of lubricant to the bearing or the like to be supplied therewith, simultaneously with the intake into the device of a similar volume for delivery at the next succeeding actuation, and the automatic transfer of the freshly received lubricant from the intake into the delivery end of the device between successive actuations.

A further object of the invention is to provide a device of the character defined in the next preceding paragraph, which may be easily and quickly adjusted to vary the volume of lubricant discharged thereby at each actuation without removing the same from the system or disassembling it.

Another object of the invention is to provide a device as defined in the two next preceding paragraphs, which may be positioned in any desired manner with respect to the direction of discharge or intake of the lubricant without in any way affecting its efficiency.

A further important object of the invention is to provide a device as defined in the three next preceding paragraphs, which is constructed wholly of parts capable of being produced by automatic and semi-automatic machinery and wherein ample tolerances are permissible and necessary, respectively, to thereby render the same easily and cheaply producible, and easy of assembly, etc.

A further object of the invention is to provide a lubricating system of the type specified which includes means, such as an auxiliary pump or pumps, whereby any desired group of bearings may be supplied at intervals between operations of the main pump for supplying all bearings in the system without in any way interfering with the operation of the main pump with respect to supplying all bearings simultaneously.

Another important object of the invention is to provide a device for feeding a measured volume of lubricant under pressure, as above defined, which may be adjusted to vary the volume fed thereby to an engine compressor, pump cylinder or other unit presenting counter-pressure to the oil, during operation of the said engine or the like, without interruption of said operation.

While the invention relates particularly to force-feed lubrication, it will be obvious that it may also be applied to feeding fluids other than lubricating oil, as, for example, feeding measured quantities of water-softening or treating fluid to water; or, vice versa, feeding water in measured quantities for any desired purpose; feeding measured quantities of syrups or flavoring extracts, etc., and many other purposes.

The invention may be variously embodied and in the accompanying drawings I have illustrated several embodiments thereof.

In said drawings:

Fig. 1 is a view in central longitudinal section, of a pump for feeding fluid through piping to a number of bearings, the piping being shown mainly in elevation, together with fluid measuring devices embodying the invention interposed in the same.

Fig. 2 is a central longitudinal section of a fluid measuring device constructed in accordance with the invention.

Fig. 3 is a plan section on the line 3—3 of Fig. 2.

Fig. 4 is a side elevation of the device of Figs. 2 and 3.

Fig. 5 is a view similar to Fig. 2, illustrating another embodiment of the fluid measuring device, and Fig. 6 in a cross section on the line 6—6 of Fig. 5.

The system or apparatus of my invention includes an ordinary pump 1, which may be manually or otherwise operated to discharge contained lubricating oil or other fluid, into piping leading to points of discharge, under a pressure sufficient to readily overcome resistance to its discharge into a bearing, engine or pump cylinder or other device.

Preferably the pump cylinder has a check-valve controlled connection 2 with a suitable source of supply of the fluid, said source being omitted from illustration. In most instances a manually operable pump will probably be used and I have, therefore, illustrated the pump-piston 3 as equipped with a piston-rod 4 passing through the removable head 5, a compression spring 6 being operatively associated with the piston-rod 4 and head 5 to normally maintain the piston at the outer limit of its suction stroke. The lever 7 pivotally secured to the head 5 and disposed to bear between its ends on the piston-rod, may be manually or otherwise actuated to impart movement to the piston 4 against the action of the spring 6. For reasons hereinafter explained, the discharge-port 8 of the pump-cylinder 1 is not equipped with a check-valve.

The piping consists, preferably, of the main lead 9, and main and auxiliary branches 10, 11 and 12, respectively, the group 12, for example, leading to a certain group of bearings of a certain machine or to a given group of other elements to be supplied with the fluid and which, under certain conditions, it may be desirable to supply independently of all other bearings or the like, comprised in the system. For this purpose there is interposed in the branch 11 a small manually operable pump 13 corresponding in construction with the pump 1.

The several devices to be supplied with the fluid are indicated by reference characters 14 and, for convenience, indicate bearings to be lubricated.

Interposed in each lead to a bearing or a group of bearings or other devices 14 to be supplied with the fluid, is a measuring device such as is shown in Fig. 2, or a modification thereof such as is shown in Fig. 3, or as further modified by omission of parts as hereinafter explained.

The device of Fig. 2 represents the preferred embodiment of the invention. It comprises the housing element 15 made, preferably, from hexagonal metal rod, such as brass, having the threaded stem 16, the internal threads 17, and the smooth bore portion 18 of larger diameter than the threaded portion of said bore. Mounted within said housing element 15 for direct communication with the stem 16, is the housing 19 for the check-valve 20.

Associated with the housing element 15 is the housing element 21 having the smooth cylindrical bore 22 terminating in a valve-seat 23 bordering the intake port 24. For the sake of convenience and low cost of manufacture, the intake end of the element 21 constitutes a part of the compression pipe coupling which includes the packing element 24$^a$ and sleeve 25 for rolling the tapered end portion of the packing element 24$^a$ into engagement with the tubing through which fluid is supplied.

The element 21 is provided at its lower or outer end with external threads to engage the internal threads of the element 15, and is further provided with a smooth cylindrical outer surface portion 26 terminating at the annular shoulder 27, said smooth portion 26 being opposed in whole or in part to the smooth bore portion of the element 15 and being of sufficiently smaller diameter than the latter to permit a packing 28 to be disposed in the annular space between said smooth surfaces.

Mounted for reciprocation in the bore 22 of the member 21, is the hollow trunk-piston 29 in the head of which is a central opening 30 bordered by the valve-seat 31 on which the valve 32 is adapted to seat, the latter being also adapted to seat on the valve-seat 23. Said valve is preferably provided with a short stem 33 adapted to project into and substantially fit the intake port 24. Said valve is also provided with a short stem or shank 34 having a reduced outer end portion 35 which is passed through the central opening in the radially corrugated disk 36, the free end portion of said portion 35 being upset to provide the head 37, the space between the latter and the shoulder 38 being greater than the thickness of the disk 36, and the opening in the latter of slightly greater diameter than the shank-portion 35, so that said disk and valve have relative play to thereby permit said valve to easily find its respective seats 23 and 31.

A helical compression spring 39 is interposed between the disk 36 and the head of the housing-element 15 which serves to normally maintain the valve 32 on the seat 23 and off the seat 31, the relative movement of said valve and piston being such that the opening movement of the former relatively to the seat 31 is very limited. The spring thus also serves to maintain the piston at the outer limit of its movement relatively to the discharge port controlled by the check-valve 20. The lower end of said piston is adapted to seat on the valve-seat 40 surrounding the check-valve housing 19, in order that leakage past the piston due to maintenance of pump pressure may not cause a continuing flow of lubricant from the discharge port.

The operation of the device is as follows:

Upon actuating the pump-piston 3 against the spring 6, fluid under pressure will be forced into the piping and thus into the intake port 24 of each of said devices 15—21. As the latter is completely filled with fluid at the time of such pump-actuation, and the piston 29 so snugly fits the bore 22 as to mitigate against too free movement thereof, and its movement is further resisted by the fluid between the same and the discharge port, the first result of inrush of fluid will be to seat the valve 32 on the seat 31 and thereupon force the piston 29 to the seat 40. During this stroke the fluid last-mentioned will be, in part, discharged from the device, the volume thus discharged being accurately determined by the length of the piston-stroke and the latter, in turn, is determined by the relative positions of the housing-members 15 and 21. The minimum piston-stroke is indicated in Fig. 2 and the maximum in Fig. 5, a groove 41 being provided on the member 21 for indicating when the housing-members 15 and 21 are relatively positioned for the maximum piston-stroke.

Upon release of the pump-piston 3, the latter is returned to its initial position by the spring 6 and thus the pressure in the housing 15—21 and in the piping is completely relieved.

The spring 39 will thereupon throw the valve 32 off the seat 31 and then return the piston 29 to the position shown in Fig. 2. The check-valve 20 being closed, the piston 29 cannot possibly force the fluid which entered the housing 15—21 back into the piping, because a vacuum is created in the discharge end of said housing which will cause the entered charge of fluid to pass through the now opening piston-port 30 from the intake to the discharge end of said housing. The force exerted by the spring 39 in each of the housings 15—21 must so far exceed that exerted by the spring holding the check-valve for the intake-port of the pump 1 closed as to insure influx of fluid to the pump cylinder 1 as the pistons 3 and 29 return to initial positions.

From the foregoing it will be obvious that the fluid discharged from each of the housings 15—21 will be not only of predetermined volume, but also under the direct and substantially full force of the pump-pressure. Each one of a large number of said devices 15—21 may be adjusted independently of all others to deliver whatever volume of fluid may be desired, such adjustment being easily effected at any time by merely retracting the sleeve 25 so as to permit rotation of the housing-element 21 relatively to the feed-pipe therefor, it being only essential that the piping, which will consist of copper tubing, shall include a sufficient excess (taken up in bends) as to each lead, to permit the said adjustment.

The compression-pipe couplings shown are fully described and claimed in my application for U. S. Letters Patent Serial No. 25,873, filed April 25, 1925, attention being also directed to the fact that Figs. 2 and 3 of the accompanying drawings are four times the size of the average device used most extensively commercially for lubrication. The range of adjustment of the piston-stroke is such that the volume of fluid discharged may vary from a drop or two to a comparatively large amount.

The ease of adjustment is of considerable importance, in that there are many emergencies in which adjustments must be quite rapidly effected, especially where temporary hand-lubrication is not possible. This necessity may arise particularly in the lubrication of engine, pump and compressor cylinders. Convenience of adjustment is also highly desirable in the lubrication of machine bearings as, following initial installation, it will usually be found that some bearings receive an excess and others too little lubricant, the intervals of pump actuation being determined by the needs of the bearing in the system whose requirements must be promptly supplied. Improper adjustments thus occasion waste of lubricant and the accompanying drippings and spatterings.

In every lubricating system which feeds a number of machines, some of which are operated more steadily than others, it is advisable to provide means for independently feeding lubricant to each machine or to any given group of bearings between intervals of lubricant charges to all bearings in the entire system delivered from the pump 1. This is very easily accomplished by associating with any desired bearing or group of bearings in the system, a pump 13 interposed in the pipe line feeding said bearing or group thereof, said pump 13 being exactly similar to pump 1.

Actuation of the pump 13 will, by reason of the check-valve at the intake-port thereof, throw a measured charge of lubricant into the particular bearing or group thereof associated with the discharge end of the pump 13. Following such actuation, the return of the plunger of said pump to initial position will create a vacuum sufficient to draw oil from the source thereof past the check-valve controlled intake-ports of the pumps 1 and 13. Obviously, the pump 1 may be omitted and pumps 13 used throughout the system, all thereof in that event communicating directly with the source. Or the pump 1 may be retained for operation only in emergencies such as might arise by breakage of a pump 13, the latter being ordinarily used to the exclusion of said pump 1.

The device of Fig. 5 corresponds in construction with that of Fig. 2, except to the extent that the trunk-piston 42, used in place of the piston 29, is devoid of the valve-controlled port 30 and is so loosely mounted as to permit resisted and restricted flow of lubricant past the same. This flow will take place only when the said piston is returned by the spring 39 to its normal position following a discharge stroke thereof.

The said piston 42 is provided adjacent its head end with an external annular groove 43 which opposes the flange of the leather cup-washer 44 mounted on said piston and clamped between the head thereof and the valve-element 45 which normally seats on the valve-seat 23. Said piston 42 is preferably hexagonal externally, the ridges, preferably partly cut away, and snugly fitting the bore 22 and the flat surfaces coacting with said bore to provide passages for fluid.

In operation, an incoming charge of fluid under pressure will start the piston 42 toward the discharge end of the casing 15—21. The fluid trapped in the last-named end portion of the casing must overcome the resistance to opening offered by the check-valve 20 and thus the initial movement of said piston will cause an expansion of the flange of the cup-leather to hug the bore 22 during the balance of the piston-stroke since the resistance to the said stroke continues, this being assured by using a sufficiently strong spring to maintain the check-valve 20 closed to more than counterbalance the resistance to piston-stroke offered by the spring 39. The initial piston movement will also serve to effect flaring of the cup-leather by reason of the restriction of flow of fluid into the housing until the short stem 33 of the valve end of the piston shall have passed the upper end of the valve-seat 23.

As soon as the lower end of the piston is seated on the valve-seat 40, the pressures on opposite sides of the cup-leather will be equalized so that, as soon as the pump-pressure is relieved, the spring 39 will return the piston 42 to initial position as rapidly as the resistance to flow of fluid past said piston will permit. This will, of course, depend upon the degree of fluidity or viscosity of the fluid and the area of the passage between the piston and the bore 22.

The foregoing construction may be modified by omitting the cup-leather washer 44, in which event the annular groove 43 will be unnecessary. In so modifying the structure, the spring associated with the check-valve 20 must be so light as to permit discharge of fluid at a far more rapid rate than the entering fluid can pass the piston, the spring 39 being, in that event, as light as possible, viz: just strong enough to overcome resistance to the passage of the fluid past the piston on the return stroke of the latter.

The omission of the cup-leather washer 44 is disadvantageous, in that the tolerance between the piston 42 and the bore 22 must decrease as the fluidity of the liquid increases, or, in other words, said tolerance must be increased in direct ratio to increase in viscosity of the fluid or liquid.

The bore of the stem 16 may be as large as the diameter and ordinary strength requirements permit, in order that oil may be stored therein for gravity feed to the bearing where the said stem is disposed to render such feed possible.

It will be obvious, of course that the cup-washer 44 constitutes a fluid-pressure responsive valve controlling the free space around the piston, the latter being the substantial equivalent of a piston-port.

While I have illustrated and described the invention in its preferred embodiments, it will be obvious that the same may be otherwise embodied without departure from the scope and spirit of the invention as defined in the appended claims.

I claim as my invention:

1. Pressure feed lubricating means including devices disposed to discharge lubricant to points to be supplied, said devices each comprising a cylinder having an inlet and a discharge port, a check-valve associated with one of said ports for preventing return of fluid into said cylinder, a spring-held piston reciprocable in the latter between said ports, a valve-seat associated with the discharge port and on which one end of said piston seats to shut off discharge from said cylinder as said piston attains the limit of its stroke against its holding spring, a by-pass permitting flow of lubricant past said piston, a spring-held valve controlling said by-pass to maintain the latter normally open and adapted to be closed by fluid under pressure entering the inlet port and so maintained during continuance of flow and during the stroke of said piston against its spring to thereby prevent by-passage of fluid during said stroke, said valve adapted to be maintained constantly open during the return stroke of said piston.

2. Pressure feed lubricating means including devices disposed to discharge lubricant to points to be supplied, said devices each comprising a cylinder having an inlet and a discharge port, a check-valve associated with one of said ports for preventing return of fluid into said cylinder, a spring-held piston reciprocable in the latter between said ports, a valve-seat associated with the discharge port and on which one end of said piston seats to shut off discharge from said cylinder as said piston attains the limit of its stroke against its holding spring, a by-pass opening in said piston, a normally open spring-held valve controlling the same and adapted to be closed and so maintained by fluid under pressure entering the intake port of said cylinder continuously during movement of said piston responsively to said fluid, said valve adapted to be opened by its spring and so maintained during the spring return of said piston.

3. Pressure feed lubricating means including devices disposed to discharge lubricant to points to be supplied, said devices each comprising a cylinder having an inlet and a discharge port, a check-valve associated with one of said ports for preventing return of fluid into said cylinder, a piston reciprocable in said cylinder between said ports, a valve-seat associated with the discharge port and upon which one end of the piston seats as it attains the limit of its discharge stroke, a by-pass opening in said piston, a valve controlling the same, a single spring common to said valve and said piston to maintain the former open and the latter normally at one limit of its movement, said valve adapted to be closed and so maintained during the discharge stroke of said piston responsively to fluid under pressure entering the intake port and to be opened and so maintained during the entire return stroke of said piston.

4. In a force-feed lubricating system including a source of lubricant adapted to be subjected to pressure at intervals, a device disposed between said source and an element to be fed with lubricant for delivering to the latter a predetermined volume of the same under substantial pressure, said device including a casing, a spring held piston reciprocable therein, a check-valve associated with said casing for trapping fluid received from said source, and a valve-element associated with said piston, a by-passage for fluid controlled by said valve, the latter adapted to be actuated by fluid under pressure entering said casing to feed previously contained fluid to the element to be fed with same, said valve element associated with said piston being fluid-pressure responsive and automatically closing the by-passage during actuation of said piston by the entering fluid while permitting flow of fluid through said by-passage past the piston as the latter is spring-returned to its normal position upon relief of pressure at the said source.

5. In a force-feed lubricating system, a device for delivering measured volumes of lubricant comprising a cylinder having an intake-port at one end and a discharge port at its other end, a check-valve associated with one of said ports, a piston reciprocable in said cylinder, a spring normally maintaining the same at the outer limit of its movement relatively to said discharge port, a by-passage for fluid past said piston, and a fluid pressure responsive valve carried by the latter and controlling said by-passage, said piston adapted to be actuated against said spring by fluid under pressure entering said intake-port for discharging fluid disposed between said piston and said discharge port, said fluid pressure responsive valve arranged for automatic actuation to close said by-passage by differences in fluid pressure at opposite ends of said piston during said actuation thereof and opening under the influence of the spring-pressure returning said piston to its normal position.

6. In a force-feed lubricating system, a device for delivering measured volumes of lubricant comprising a cylinder having an intake-port at one end and a discharge port at its other end, a check-valve associated with said discharge port, a piston reciprocable in said cylinder, a spring normally maintaining the same at the outer limit of its movement relatively to said discharge port, a by-passage for fluid past said piston, and a fluid pressure responsive valve carried by the latter and controlling said by-passage, said piston adapted to be actuated against said spring by fluid under pressure entering said intake-port for discharging fluid disposed between said piston and said discharge port, said fluid pressure responsive valve arranged for automatic actuation to close said by-passage by differences in fluid pressure at opposite ends of said piston during said actuation thereof and opening under the influence of the spring-pressure returning said piston to its normal position.

7. In a force-feed lubricating system, a device for delivering measured volumes of lubricant comprising a cylinder having an intake-port at one end and a check-valve controlled discharge port at the other end, a valve-seat at each end of said cylinder, a spring held piston reciprocable in the latter and normally disposed at the outer limit of its movement relatively to the discharge port, said piston including valve-formations adapted to seat on said respective valve-seats as the same attains the respective limits of its movement, there being a by-passage for fluid past said piston, a fluid pressure responsive valve carried by the piston and arranged to respond to differences in pressure at opposite ends of the latter to maintain said by-passage closed during actuation of the piston against its spring by fluid under pressure entering the intake-port of said cylinder and opening said by-passage during spring return of said piston to normal position.

8. In a force-feed lubricating system, a device for delivering measured volumes of lubricant comprising a cylinder having an intake-port at one end and a discharge port at its other end, a check-valve associated with one of said ports, a piston reciprocable in said cylinder, a spring normally maintaining the same at the outer limit of its movement relatively to said discharge port, a by-passage for fluid past said piston, and a fluid pressure responsive valve carried by the latter and controlling said by-passage, said piston adapted to be actuated against said spring by fluid under pressure entering said intake-port for discharging fluid disposed between said piston and said discharge-port, said fluid pressure responsive valve arranged for automatic actuation to close said by-passage by differences in fluid pressure at opposite ends of said piston during said actuation thereof and opening under the influence of the spring-pressure returning said piston to its normal position, and means for adjusting the stroke of said piston to vary the volume of fluid delivered from said casing at each actuation of said piston.

9. In a force-feed lubricating system, a device for delivering measured volumes of lubricant comprising a cylinder having an intake-port at one end and a discharge port at its other end, a check-valve associated with one of said ports, a piston reciprocable in said cylinder, a spring normally maintaining the same at the outer limit of its movement relatively to said discharge port, a by-passage for fluid past said piston, and a fluid pressure responsive valve carried by the latter and controlling said by-passage, said piston adapted to be actuated against said spring by fluid under pressure entering said intake-port for discharging fluid disposed between said piston and said discharge port, said fluid pressure responsive valve arranged for automatic actuation to close said by-passage by differences in fluid pressure at opposite ends of said piston during said actuation thereof and opening under the influence of the spring-pressure returning said piston to its normal position, said cylinder composed of a plurality of parts adjustable relatively to each other for varying the length thereof to thereby vary the stroke of said piston.

10. In a force-feed lubricating system, a device for delivering measured volumes of lubricant comprising a cylinder having an intake-port at one end and a discharge port at its other end, a check-valve associated with one of said ports, a piston reciprocable in said cylinder, a spring normally maintaining the same at the outer limit of its movement relatively to said discharge port, a by-passage for fluid past said piston, and a fluid pressure responsive valve carried by the latter and controlling said by-passage, said piston adapted to be actuated against said spring by fluid under pressure entering said intake-port for discharging fluid disposed between said piston and said discharge port, said fluid pressure responsive valve arranged for automatic actuation to close said by-passage by differences in fluid pressure at opposite ends of said piston during said actuation thereof and opening under the influence of the spring-pressure returning said piston to its normal position, said cylinder composed of two parts having threaded engagement with each other for varying the length of said cylinder and thereby vary the stroke of said piston.

11. In a force-feed lubricating system, a device for delivering measured volumes of lubricant comprising a cylinder having an intake-port at one end and a discharge port at its other end, a check-valve associated with one of said ports, a piston reciprocable in said cylinder, a spring normally maintaining the same at the outer limit of its movement relatively to said discharge port, a by-passage for fluid past said piston, and a fluid pressure responsive valve carried by the latter and controlling said by-passage, said piston adapted to be actuated against said spring by fluid under pressure entering said intake-port for discharging fluid disposed between said piston and said discharge-port, said fluid pressure responsive valve arranged for automatic actuation to close said by-passage by differences in fluid pressure at opposite ends of said piston during said actuation thereof and opening under the influence of the spring-pressure returning said piston to its normal position, and means operable from the exterior of the cylinder for effecting variation of the stroke of said piston.

12. In a force-feed lubricating system, a device for delivering predetermined volumes of lubricant under pressure, including a casing adapted for connection with a pump for supplying fluid under pressure thereto, fluid-pressure responsive spring held means within said casing for ejecting therefrom a predetermined volume of lubricant simultaneously with the entry into the same of a charge of lubricant from the pump, said fluid pressure responsive means including means for trapping and retaining a volume of said entering lubricant equal to the discharged volume thereof following each actuation thereof, said casing adjustable in length to thereby vary the zone of action of said fluid pressure responsive means and proportionately vary the volume of lubricant discharged at each actuation thereof.

13. In a force-feed lubricating system, a casing provided at opposite ends with an intake-port and a check-valve controlled discharge port, a piston reciprocable therein, an opening in said piston, a valve controlling the same and opposed to the intake end of said casing, and a spring common to said valve and said piston for maintaining the latter normally in the intake end portion of said casing and maintaining said valve normally open, the latter adapted to be closed by fluid under pressure entering said casing to thereby cause said piston to be actuated by the same.

14. In a force-feed lubricating system, a cylinder provided at opposite ends with an intake-port and a check-valve controlled discharge port, a valve seat bordering said intake-port, a trunk-piston reciprocable in said cylinder, a port in said piston, a valve controlling the same and adapted also to seat on the valve-seat aforesaid, a spring common to said valve and said piston for maintaining the latter normally in the intake end portion of said cylinder and maintaining said valve seated on the valve-seat and maintaining said piston port open, said valve adapted to close said piston-port as it is unseated by incoming fluid under pressure, to thereby cause the latter to move the piston to the discharge end portion of the cylinder.

15. In a force-feed lubricating system, a cylinder provided at opposite ends with an intake-port and a check-valve controlled discharge port, a valve seat bordering said intake-port, a trunk-piston reciprocable in said cylinder, a port in said piston, a valve controlling the same and adapted also to seat on the valve-seat aforesaid, a spring common to said valve and said piston for maintaining the latter normally in the intake end portion of said cylinder and maintaining said valve seated on the valve-seat and maintaining said piston port open, said valve adapted to close said piston-port as it is unseated by incoming fluid under pressure, to thereby cause the latter to move the piston to the discharge end portion of the cylinder, the latter comprising a plurality of relatively adjustable sections for varying its length to thereby vary the piston stroke.

16. In a force-feed lubricating system, a cylinder provided at opposite ends with an intake port and a check-valve controlled discharge port, a valve seat bordering said intake-port, a trunk-piston reciprocable in said cylinder, a port in said piston, a valve controlling the same and adapted also to seat on the valve-seat aforesaid, a spring common to said valve and said piston for maintaining the latter normally in the intake end portion of said cylinder and maintaining said valve seated on the valve-seat and maintaining said piston port open, said valve adapted to close said piston-port as it is unseated by incoming fluid under pressure, to thereby cause the latter to move the piston to the discharge end portion of the cylinder, and means for adjusting the stroke of said piston.

17. In a force-feed lubricating system, a casing provided at opposite ends with an intake-port and a check-valve controlled discharge port, a piston reciprocable therein, an opening in said piston, a valve controlling the same and opposed to the intake end of said casing, a stop device loosely associated with said valve and said piston for limiting their relative movement while permitting passage of fluid when said valve is open, a spring bearing on said stop device for normally maintaining said valve open and said piston in the intake end portion of said casing, said valve adapted to be closed by fluid under pressure entering said casing to thereby cause said piston to be actuated by the same.

18. In a force-feed lubricating system, a casing provided at opposite ends with an intake-port and a check-valve controlled discharge port, a piston reciprocable therein, an opening in said piston, a valve controlling the same and opposed to the intake end of said casing, a stop device loosely associated with said valve and said piston for limiting their relative movement while permitting passage of fluid when said valve is open, a spring bearing on said stop device for normally maintaining said valve open and said piston in the intake end portion of said casing, said valve adapted to be closed by fluid under pressure entering said casing to thereby cause said piston to be actuated by the same, said valve adapted to seal said intake port against back-flow of lubricant as it attains its normal position.

19. In a force-feed lubricating system, a casing provided at opposite ends with an intake-port and a check-valve controlled discharge port, a piston reciprocable therein, an opening in said piston, a valve controlling the same and opposed to the intake end of said casing, a stop device loosely associated with said valve and said piston for limiting their relative movement while permitting passage of fluid when said valve is open, a spring bearing on said stop device for normally maintaining said valve open and said piston in the intake end portion of said casing, said valve adapted to be closed by fluid under pressure entering said casing to thereby cause said piston to be actuated by the same, and a projection on said valve adapted to enter said intake-port as the same attains its normal position in said casing.

20. In a force-feed lubricating system, a cylinder provided at opposite ends with an intake port and a check-valve controlled discharge port, a valve seat bordering said intake-port, a trunk-piston reciprocable in said cylinder, a port in said piston, a valve controlling the same and adapted also to seat on the valve-seat aforesaid, a spring common to said valve and said piston for maintaining the latter normally in the intake end portion of said cylinder and maintaining said valve seated on the valve-seat and maintaining said piston port open, said valve adapted to close said piston-port as it is unseated by incoming fluid under pressure, to thereby cause the latter to move the piston to the discharge end portion of the cylinder, and a projection on said valve adapted to enter the intake-port as it seats on said valve seat bordering the latter.

21. A force-feed lubricating system including a pump element having a valveless discharge port, a casing connected at one end with the latter and provided at its other end with a check-valve controlled discharge port, a piston in said casing, a port in the latter, a valve controlling said port, a spring associated with said valve and said piston for maintaining said valve normally open and said piston normally in the intake end portion of said casing, said valve opposing the intake end of said casing and adapted to be closed by the initially entering fluid under pressure, to thereby cause the latter to move the piston to the discharge end portion of the latter to eject the fluid therein contained, said spring adapted to open said valve immediately upon release of the pump-pressure and coacting with said check-valve controlled discharge port to cause the entering fluid to pass through said port as said piston is spring-returned to normal position.

22. In a force feed lubricating system, a device associated with a bearing to be lubricated and including a casing consisting of two separable and relatively adjustable members arranged to permit the varying of the length thereof, one of said members provided with a discharge port and the other with an intake port, and a spring-held fluid pressure responsive member within said casing normally disposed at the intake end thereof and movable by fluid pressure to seal the discharge port, the stroke of said member variable coincidentally with variations in length of said casing to thereby vary the volume of oil discharged from the latter at each fluid pressure actuation of said member.

23. In a force feed lubricating system, a device associated with a bearing to be fed including a casing presenting a cylindrical bore, there being intake and discharge openings at respectively opposite ends of said bore axially aligned therewith, a spring-held fluid pressure responsive member reciprocably mounted in said casing for movement between said openings, said casing consisting of two members having threaded engagement with each other to permit adjustment thereof relatively to each other to increase and decrease the length of the casing and thereby correspondingly vary the stroke of said reciprocable member.

24. In a force feed lubricating system, a device associated with a bearing to be fed including a casing presenting a cylindrical bore, there being an intake opening at one end and a discharge opening at the other end of said bore, a spring-held fluid pressure responsive member reciprocably mounted in said casing for movement between said openings, said casing consisting of two members having threaded engagement with each other to permit adjustment thereof relatively to each other to increase and decrease the length of the casing and thereby correspondingly vary the stroke of said reciprocable member, said members of said casing presenting opposed smooth cylindrical surfaces exteriorly of said bore, and a packing interposed between said surfaces.

In testimony whereof, I have hereunto set my hand this 22nd day of November, 1924.

IRVING COWLES.